INVENTOR
P. M. G. TOULON
BY [signature]
ATTORNEYS

Feb. 21, 1961 P. M. G. TOULON 2,972,660

FREQUENCY ADJUSTMENT SYSTEM

Filed Sept. 3, 1952 2 Sheets-Sheet 2

*INVENTOR*
P. M. G. TOULON

BY *Moore & Hall*

*ATTORNEYS*

2,972,660

FREQUENCY ADJUSTMENT SYSTEM

Pierre Marie Gabriel Toulon, New York, N.Y., assignor, by mesne assignments, to Moore and Hall, Washington, D.C., a partnership Filed Sept. 3, 1952, Ser. No. 307,607

21 Claims. (Cl. 178—7.2)

The present invention relates to an automatic or self-monitoring device and process for maintaining one or more radio frequency oscillators within a desired value of another or standard frequency by adjustment of one of the components of one of the oscillators in the proper sense or direction. Although the component here adjusted is the condenser the same theory can be applied to the adjustment of the inductance of the tank or oscillator circuit.

In hand tuning to a given frequency an experienced operator can soon tell in which direction to adjust the circuit components to yield the desired frequency, but with automatic equipment means must be provided to indicate whether the signal to be adjusted has a frequency which is above or below the reference frequency.

The present invention has a general and specific aspect. In general the invention relates to an automatic process and apparatus which has for its purpose to cause two frequencies to become and to remain the same within selected limits. It is an object of the invention automatically to adjust a variable radio frequency to the same value as another frequency which may be regarded as the reference frequency. The reference frequency may itself be adjustable either manually or by an independent signal source.

It is an object of the invention to maintain two radio frequencies the same within selected limits by beating one frequency against the second frequency in a circuit arrangement in which the second frequency is advanced in phase in one portion thereof and retarded in phase in another portion thereof.

It is an object of the invention to adapt the general result of causing two frequencies to remain the same within selected limits to the specific purpose of maintaining a lens in focus.

It is an object of the invention to cause a lens forming part of a television reproduction system to be so positioned that its focal point is maintained on the picture record which is being reproduced.

The comparison of two frequencies by means of "beating" or interference can be a very accurate way of determining their difference particularly with short waves, but requires some way of determining relative value or whether the frequency to be adjusted is higher or lower than the reference frequency. For automatic adjustment this relative difference is determined by breaking up the reference frequency into two or more different and independent phases which are phase shifted with respect to each other a total of ninety electrical degrees. This is accomplished by advancing the phase of one portion of the reference signal by forty-five degrees and retarding a second portion by forty-five degrees, yielding F′ 45 degrees lagging and F′ 45 degrees leading.

When the signal to be adjusted is opposed to these two phase shifted signals it is evident that the maxima of the resultant voltages are likewise phase shifted or displaced in time, but the order of the two maxima will depend upon whether the frequency F to be adjusted is greater or less than the reference frequency F′. It is an object of the invention to utilize the order or sequence of the two beating frequencies for the purpose of adjusting the frequency F in the proper sense or direction, up or down.

The drawing is made part of the present disclosure to illustrate the general invention and one of its specific applications in the field of television. They are intended to be illustrative and to be representative only and are not to be taken as limiting.

In the drawings like numerals refer to like parts throughout.

Figure 1:
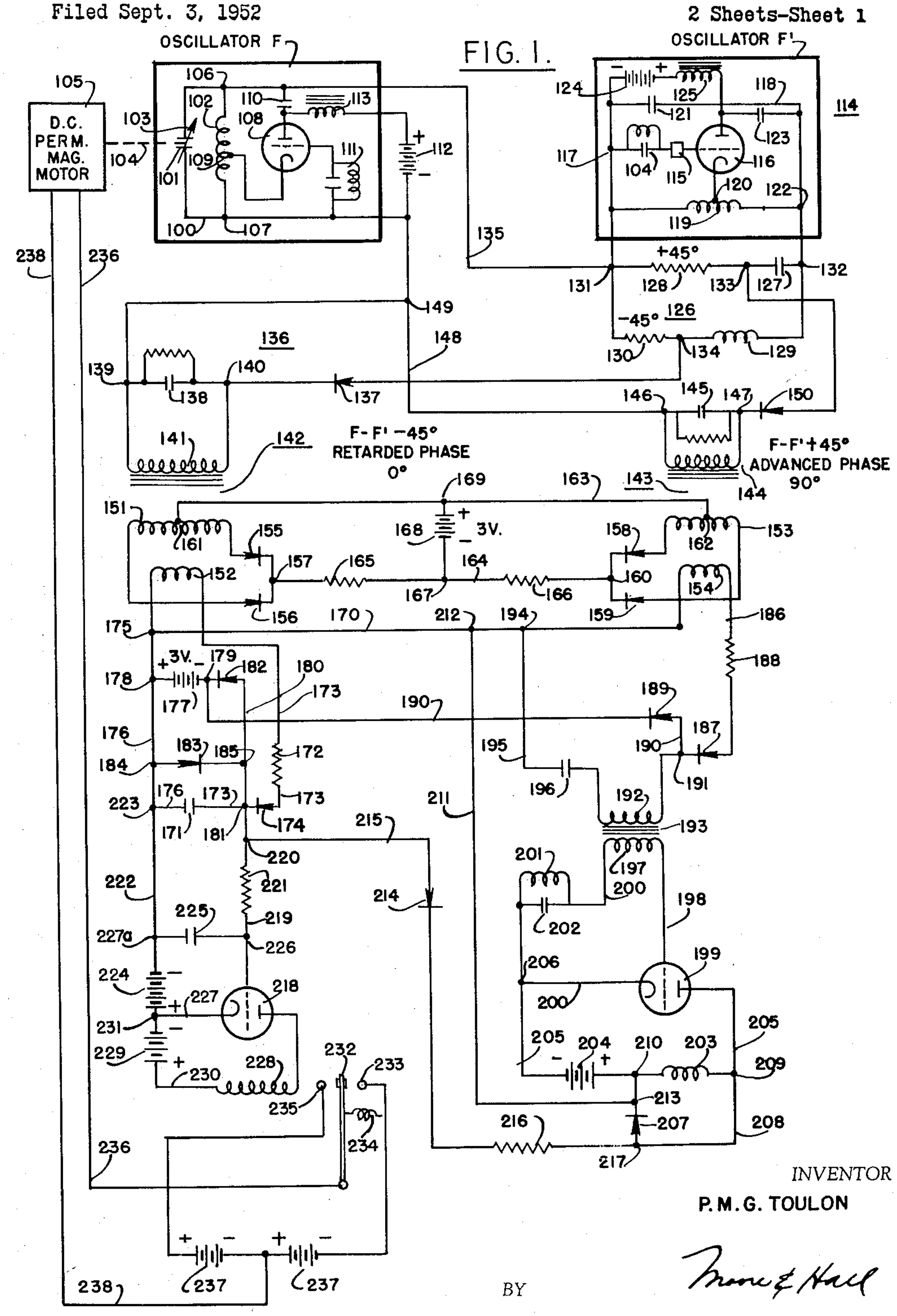
Fig. 1 is a schematic circuit diagram of a general form of the invention.

Before setting forth the full detailed explanation of the system of Fig. 1, a generalized and simplified explanation will be presented.

The automatic frequency control system of this invention adjusts the frequency of an oscillator toward a fixed value. This fixed value is established by another oscillator. The frequency of oscillator F is urged from either a higher or a lower frequency towards the same frequency as that of fixed oscillator F′. The system for producing this effect operates as follows: The signal from oscillator F′ is divided into two separate signals which are about ninety degrees apart in phase. Signal from oscillator F is mixed with each of these separate phase signals, and each mixed signal is rectified. The outputs of the two rectifiers provide beat notes at the same difference frequency, F minus F′, but the phases of the two difference frequency signals are also about ninety degrees apart. When the variable frequency F is greater than the reference frequency F′, the signal across transformer primary 141 leads the signal across transformer primary 144, otherwise it lags it.

Condenser 171 is charged by rectifier 174, which is energized from the retarded phase secondary 152. Condenser 171 is discharged by rectifier 214, which is energized from the advanced phase secondary 154. When frequency F is higher than frequency F′ the discharge of condenser 171 follows the charge promptly, so that the condenser is only charged one quarter of the time, but when frequency F is lower than frequency F′ the discharge precedes the charge, so that the charge is present on condenser 171 three quarters of the time. When frequency F is the same as frequency F′, no difference frequency voltage is generated, and neither secondary is energized. The voltage across condenser 171 is then constant and at a fixed intermediate value. This value is based upon the leakage of the rectifiers 174 and 183 of one polarity balancing the leakage in the other direction of rectifier 214 of the other polarity.

Condenser 225 is charged by condenser 171 through resistor 221. Whether condenser 225 charges up to three quarters or one quarter of the peak potential in condenser 171 depends upon whether the peak is present three quarters or one quarter of the time.

The voltage across condenser 225 is applied to the grid of tube 218. When the plate current of tube 218 is of an intermediate value the magnetic pull on armature 232 balances the spring 234 and both contacts 233 and 235 are open. If condenser 225 is charged to a low value, contact 233 closes, operating motor 105 to rotate shaft 104 of condenser 101 to decrease the frequency of oscillator F.

Limiters, consisting of battery 177 and rectifier 182 on the one hand, and battery 177 and rectifier 189 on the other hand, limit the peak voltages of secondaries 152 and 154 respectively to three volts, thereby generating square waves in the secondary circuits for application to condenser 171.

Windings 151 and 153 on transformers 142 and 143 respectively, operate as part of limiter circuits. A three volt battery 168 opposes conduction of either rectifier 155 or 156 across winding 151, and similarly, opposes conduction through rectifiers 158 and 159 across secondary 153. This system not only equalizes the energy supplied from the primaries to the respective secondaries, but also diverts excessive flux in the transformers so that no more than a predetermined amount can reach the secondary windings.

Rectifier 207 prevents the voltage across inductance 203 from reversing. Rectifier 183 prevents condenser 171 from discharging beyond zero volts as it otherwise might through rectifier 214. The details of the connections and operation of this circuit will now be described.

Fig. 1 shows a circuit arrangement for the automatic adjustment of a variable or potentially variable radio frequency to the same or substantially the same frequency, depending upon the order of magnitude involved, as a reference frequency which may be standard or itself adjustable manually to produce a desired result such as adjusting the position of a lens for focusing. The device may be used to adjust the capacitance of a condenser.

Variable frequency F of oscillator F has value which corresponds to the resonant frequency of the tank circuit 100 comprising variable condenser 101 and inductance coil 102. The control rod of variable condenser 101 is connected to the shaft 104 of permanent field magnet D.C. motor 105. An oscillation sustaining tube or valve 108 is connected across junctions 106 and 107 of tank 100 and comprises an anode connected to junction 106 through condenser 110, a cathode connected to tap point 109 on inductance coil 102 and a grid connected to junction 107 through tank 111. A plate battery 112 has its positive terminal connected to the plate of valve 108 through load coil 113 and its negative terminal connected to the grid at terminal 107. The resonant frequency of tank 100 is of the order of a hundred megacycles per second.

Standard or control oscillator 114 also has a frequency of a hundred megacycles per second or a wave length of about three meters. Oscillator 114 comprises a quartz crystal or equivalent means 115 connected to the grid of driving tube 116 and to junction 117 of tank 118 through tank 104*a*. Tank circuit 118 comprises a coil 119 with its mid point 120 connected to the cathode of tube 116 and a condenser 121 across junctions 117 and 122. The plate of tube 116 is connected to junction 122 through condenser 123 and to the positive terminal of plate battery 124 through load coil 125. The negative terminal of plate battery 124 is connected to junction 117.

A phase shift circuit 126 comprises a condenser 127 in series with a resistor 128 and a coil 129 in series with resistor 130 connected in parallel at junctions 131 and 132 which are connected respectively to junctions 117 and 122 of tank circuit 118. A junction 133 is provided between condenser 127 and resistor 128 and a similar junction 134 is provided between coil 129 and resistor 130.

Junction 131 of phase shift circuit 126 is connected to junction 106 of tank 100 by wire 135. A demodulator 136 comprises a rectifier 137 in series with condenser 138 and its shunt resistor connected across the terminals 139 and 140 of primary 141 of transformer 142. A corresponding transformer 143 has its primary 144 connected across a condenser 145 and paralleled resistor to terminals 146 and 147. Junction 146 is connected to junctions 107 and 139 by wire 148 at junction 149. Junction 147 is connected to junction 133 through demodulating rectifier 150.

It will be noted that a voltage with a frequency of F will appear across junctions 149 and 131. Another voltage with a frequency of F' will appear across junctions 131 and 132. Condenser 127 is so chosen that the voltage across resistor 128 is advanced in phase by forty-five degrees. The inductance of coil 129 is so chosen that the voltage F' across resistance 130 is retarded in phase by forty-five degrees. The voltage F across junctions 131 and 149 is combined with the voltage F' advanced in phase forty-five degrees across resistance 128, demodulated by rectifier 150 and applied across terminals 146 and 147 of primary 144 of transformer 143. The same voltage F across junctions 131 and 149 is combined with the voltage F' retarded in phase forty-five degrees across resistance 130, demodulated by rectifier 137 and applied across terminals 139 and 140 of primary 141 of transformer 142. Primary 141 receives the envelope or demodulated beat frequency of F—F' retarded so as to pass through the origin at zero time. Primary 144 receives the envelope or demodulated beat frequency of F—F' leading the voltage across primary 141 by ninety degrees.

Transformers 142 and 143 have double secondaries 151, 152 and 153, 154 respectively. Of these secondaries 151 and 153 act as voltage limiters to limit the voltage to a three volt maximum. Secondary 151 has its terminals connected to rectifiers 155 and 156 which are joined at junction 157. Secondary 153 has its terminals connected to rectifiers 158 and 159 which are joined at junction 160. The midpoints 161 and 162 of secondaries 151 and 153 are connected by wire 163. Junctions 157 and 160 are connected by wire 164 having resistors 165 and 166 with junction 167 there-between. A three volt battery 168 has its negative terminal connected to junction 167 and its positive terminal connected to junction 169 with wire 163. Secondaries 151 and 153 function to limit the voltage to a maximum amplitude of three volts over a wide range of phase, e.g. whether the frequency is ten kilocycles or ten megacycles.

The lagging envelope or rectified signal in primary 141 and the corresponding leading signal in primary 144 are reproduced in secondaries 152 and 154 respectively connecteed in opposing relation by wire 170. Secondary 152 is connected across condenser 171 through resistor 172 and rectifier 174 in wire 173 and wire 176 leading from junction 175 with wire 170. A three volt battery 177 has its positive terminal connected to junction 178 with wire 176. The negative terminal 179 of battery 177 is connected across condenser 171 through rectifier 182 by wire 180 connected to junction 181 with wire 173. Battery 177 and rectifier 182 limit the tank voltage of secondary 152 and condenser 171 to three volts. A second rectifier 183 is connected across condenser 171 in reversed direction at junctions 184 and 185 with wires 176 and 180 to permit the voltage of condenser 171 to go negative. Condenser 171 is charged by each beat of the rectified envelope signal through rectifier 174.

Secondary 154 is connected by wire 186 containing resistance 188 to rectifier 187 which gives half waves. A second rectifier 189 is connected by wire 190 across negative terminal 179 of battery 177 and the other terminal of rectifier 187 at junction 191. The primary 192 of transformer 193 is connected to junction 191 and to junction 194 with wire 170 by wire 195 containing condenser 196. Rectifier 189 limits the amplitude of the half wave produced by rectifier 187.

The limited square wave produced by rectifiers 187 and 189 is amplified to yield two oppositely peaked voltages. Secondary 197 has one side connected by wire 198 to the grid of amplifier triode 199 and the other side connected to the cathode of tube 199 by wire 200 containing inductance 201 and condenser 202 in parallel. The amplifying circuit comprises an inductance 203 and plate battery 204 connected across the plate and cathode of tube 199 by wire 205 leading to junction 206 with wire 200. A rectifier 207 for suppressing the negative peak is connected across inductance 203 by wire 208 leading from junction 209 to junction 210. Wire 211 connects junction 212 on wire 170 to junction 213 on wire 208. Condenser 171 is discharged by rectifier 214 connected by wire 215 containing resistance 216 between junction 217 with wire 208 and junction 181.

Condenser 171 is connected to the grid of tube 218 by a wire 219 leading from junction 220 with wire 215 and containing resistor 221. Wire 222 leads from junction 223 with wire 176 to the cathode of tube 218 through battery 224. A damping condenser 225 is connected across wires 219 and 222 at junctions 226 and 227, respectively. The plate circuit of tube 218 comprises a relay coil 228 and plate battery 229 connected by wire 230 to the plate and junction 231 with wire 222. Armature 232 is biased toward contact 233 by tension spring 234 and is drawn toward contact 235 by coil 228. Armature 232 is connected to one side of motor 105 by wire 236. Contacts 233 and 235 are connected across battery 237 having its mid tap connected with the other side of D.C. motor by wire 238.

In the operation of the above circuit it will be noted that although the form of the envelope obtained is the same as normal the order of the peaks of the two voltage curves depends upon whether F' is higher or lower than F. F' is separated into $f'_0$ and $f'_{90}$. If $F'<F$ the peak of the envelope of $f'_0$ occurs before $f'_{90}$. The opposite is true where $F'>F$ when $f'_{90}$ comes first. These envelope peaks appear at transformers 142 and 143. The peak of the first $f'_0$ is used to charge condenser 171 to three volts on each beat through the rectifier 174 of the envelope minus forty-five degrees. The peak of $f'_{90}$ is fed to amplifier 199 et seq. and by a very accurate action at rectifier 214 discharges the condenser 171, condenser 225 serving as a damper. In the case of $F'>F$ the duration of the charge on condenser 171 is three-quarters of the time interval and in the case of $F'<F$ the duration is only one-quarter.

It follows that the average values of the two voltages are different by a factor of three. This differential value serves to determine the direction of rotation of motor 105 because of the differential effect on armature 232 biased by spring 234. In a home television reproducer using a transparent record 300 as a picture source, shown schematically in Fig. 2, the coil 314 replaces the coil 228 of Fig. 1 and the motor 105 and circuitry 232 through 238 is eliminated. Tuning or focusing is achieved by the manual adjustment of condenser 104 until a sharp focus is obtained as explained below.

Figures 2, 3:
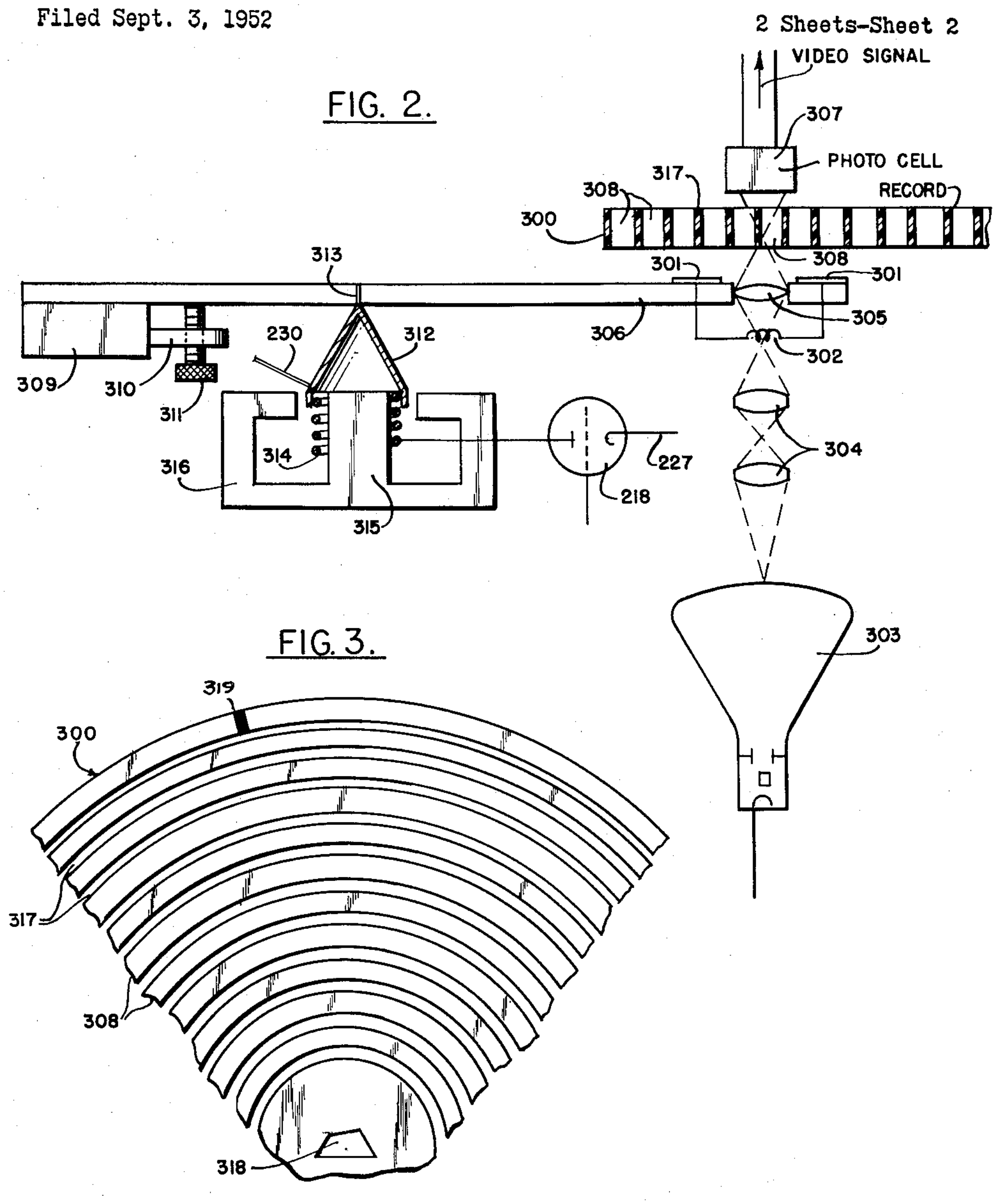
Fig. 2 is a detail showing an application of the invention of Fig. 1 to a television reproducer.
Fig. 3 is a plan view of one form of a television record having a spiral light value path storing video signals.

An application of the invention to the field of television with particular reference to the storing and reproduction of television programs is shown in Fig. 2.

In the structure of Fig. 2 a home television set is equipped to produce a program from a record 300 which resembles a phonograph record in general appearance. Record disc 300 is formed of a plastic base into which a glycerine acid has been introduced, it is both transparent and conductive. Record 300 has a spiraloid track somewhat like the groove in a sound record. The track comprises a path about one and a half millimeters in width of grainless special photographic silver salt or similar material such as used in the Lippmann process forming a light valve. A flying spot sweeps across the 1½ mm. path picking up six hundred dot video signals from each horizontal line. A multiplier phototube is used for the necessary high definition and as a source of electrical signals representing an image to be reproduced.

For a discussion of the flying spot action reference is made to Principles of Television Engineering, pages 83–89, Fink, McGraw-Hill, 1940, and Basic Television, pages 18, 19 and 34, Grob, McGraw-Hill, 1949. See also Vacuum Tubes, sec. 19.10, Spangenberg, McGraw-Hill, 1948.

The record 300 is mounted for rotation and also for movement bodily in translation. Where separate records are used for video and sound signals they are synchronized by suitable gearing, the sound record turning 33⅓ r.p.m. and the video record at 1½ r.p.m. This speed differential is allowed for on records carrying both sound and video signals. Such a construction is considered to be within the scope of the present invention.

Where the record carries the video signals only, without sound, the construction may be as shown schematically in Figs. 2 and 3. The spiral light valve track of record 300 receives light from a small cathode ray tube 303 which in this case makes a line across the spiral track as the flying spot moves. A lens system 304 focuses the light on a movable lens 305 mounted on spring arm 306. Two condenser plates 301, corresponding to condenser 101, are placed on arm 306, one on each side of movable lens 305. An inductance 302, corresponding to inductance 102, is connected across the plates 301 to form a high "Q" tank circuit which contains just enough inherent resistance to make it sufficiently stable to yield optimum results. A multiplier photocell 307 is aligned with track 308 on the opposite of record 300 from scanning tube 303.

Alternatively, a source of light may be used in place of photocell 307 and a small camera tube such as a cathode ray flying spot scanner may be used in place of cathode ray scanning tube 303, in which case the video signal will be generated by the camera tube. This reversal of direction of intelligence flow with respect to storage record 300 is entirely within the spirit of the invention of the disclosure and is representative of the many variations in structure to achieve the same or equivalent results.

Alternatively, a source of light may be used in place of photocell 307, and a small camera tube such as a "Vidicon" may be used in place of cathode ray scanning tube 303, in which case the video signal will be generated by the camera tube.

It will be seen that the conductive record 300 forms part of the electrical circuit of condenser 301 and that the effective capacity of condenser 301 and therefore the resonant frequency of the tank circuit 301—302 is a function of the distance between record 300 and condenser plates 301. It follows that the sharpness of focus of the flying spot on track 308 by lens 305 is also a function of this same distance. This structure can therefore be said to translate the distance of lens 305 from the film track 308 into the resonant frequency of tank circuit 301—302.

Spring arm 306 is attached to mounting 309 which carries a projecting arm 310 and a set screw 311 which bears against arm 306 and affords means to make an initial setting of arm 306 and lens 305.

A cone 312 of aluminium, magnesium or other non-ferrous metal of low mass is suspended from arm point 313 on arm 306 and supports coil 314 over the central post 315 of permanent magnet 316. Coil 314 may be substituted for coil 228 and motor 105 and elements 232 through 238 eliminated.

The action on coil 314 is somewhat different and the coil 314 should be so connected that the voltage having the larger value opposes the action of gravity in those constructions where gravity is a factor. However, the spring constant of arm 306 and the mass of the system may be such as to make gravitational effects relatively unimportant and it may be desirable to bias cone 312 or arm 306 in the direction of the smaller value so as to balance the forces acting to move lens 305. It might be noted that the plate current of tube 218 passing through coil 228 (or coil 314) is substantially independent of the difference between F and F' even if they are of different orders of magnitude. It will be understood that motor 105 an delements 232 through 238 were employed to disclose the general case of maintaining two frequencies the same and are normally to be replaced by the elements used to adapt the invention to a specific application of which the reproduction of visual programs is only one of many. The above arrangement could of course be readily adapted for use with motion picture film of either commercial or home movie size with or without an attached sound track.

The record of Fig. 3 is shown as a disc 300 having 1.5 mm. spiral path 308 having a series of pictures or frames about a millimeter high corresponding on a reduced scale to the frames of a motion picture film and a spiral space 317 between turns of about one tenth mm. in width. A central hole 318 of irregular outline, is used where separate records are used for video signals and sound so that their initial positions are fixed and automatically synchronized. Synchronism is maintained by gearing as mentioned above. The records 300 may of course be cylindrical or film.

In the television reproducer circuit of Figs. 1 and 2 combined, condenser 101 or its parallelled inductance is adjustable by small increments by a knob or the like on a micrometer dial. If the reproducer is out of focus during operation condenser 101 is adjusted manually until lens 305 focuses accurately and an optimum picture is obtained. The circuit of Fig. 1 maintains the focus thereafter. The adjustment of arm 306 by set screw 311 is normally set at the factory and is not changed in normal tuning.

The record 300 and the separate sound track may be synchronized manually if desired and for this purpose may be supplied with a peripheral starting or positionink mark 319. A mark such as 319 may be placed on both video and sound records, film or the like. Sound control signals for synchronization may be impressed on opaque spiral portion 317, picked up and applied to the audio circuit as is now done for motion picture sound synchronization. With improved equipment spiral space 317 may carry the sound track corresponding to the video track 308. Such sound track may be single or of multiple parallel micro-groove paths. The use of multiple paths in parallel with corresponding pickup heads for each path permits the recording of two, three or more frequency ranges within the audible range which are selectively recorded on the parallel paths and combined to give full range sound. This arrangement permits full use of the space 317 and prevents undue crowding of the sound signals caused by the very slow speed of rotation of one and a half r.p.m.

The record 300 may be made conductive by using a cobalt salt in the record composition itself or as a surface layer or coating.

While I have described what I at present consider the preferred embodiments of my invention, it will be obvious to those skilled in the art that various changes and modifications can be made therein without departing from my invention, and I, therefore, have used generic terminology in the appended claims to cover all such changes and modifications as fall within the true spirit and scope of my invention.

I claim:

1. In a device for comparing the frequencies of two sources of electrical oscillations, means for heterodyning the oscillations from one source with the oscillations from the other source in one phase relation, means for heterodyning the oscillations from said one source with the oscillations from said other source in another phase relation which is substantially different from the first phase relation, means for separately demodulating the resulting heterodyne envelopes, means for indicating the occurrence of a change when stimulated by a rising voltage and a further change when stimulated by a falling voltage, and connections for applying to said indicating means one of said demodulated envelopes to supply a rising voltage and the other of said demodulated envelopes to supply a falling voltage, the average duration of the period between the changes caused by the two envelopes indicating which frequency is greater.

2. The combination set forth in claim 1 utilized for the control of the frequency of one of said sources of oscillations comprising means for applying the signal from said indicating means to the frequency control element of one of said sources of electrical oscillations in such a direction as to reduce the difference in frequency of said oscillations.

3. In a device for comparing the frequencies of two sources of oscillations, a reference source of radio frequency oscillations, circuit means having a radio frequency phase shifting portion connected to said source, a source of radio frequency signal oscillations connected to said circuit means, said circuit means being constructed and connected to produce two reference oscillations of the same frequency separated in phase by approximately one quarter cycle with respect to each other and to combine signals from said second source with the two separate phase oscillations to produce two wave trains of separated phase, each having an envelope frequency depending upon the difference between the frequencies of said reference frequency oscillations and said radio frequency signals, said circuit means having demodulator means for said wave trains to produce waves having the frequency of the envelopes of said trains of waves rectifying means to produce trains of half waves from said envelope waves, means to convert one of said trains of half waves into square waves, charge storage means for said train of square waves, means to produce a peaked voltage train from the other of said half wave trains, and discharge means connected to apply said peaked voltage train to said charge storage means to discharge it, so that the voltage of said charge storage means is of large or small average value depending upon whether the frequency of said reference oscillations is greater or less than that of said radio frequency signals.

4. In a device for comparing and adjusting two frequencies, a reference source of radio frequency oscillations, circuit means having a radio frequency phase shifting portion connected to said source, a source of radio frequency signals connected to said circuit means, said circuit means being constructed and connected to produce two reference oscillations of the same frequency shifted in phase by approximately a quarter cycle with respect to each other and to combine signals from said second source with the two phase shifted oscillations to produce two pulse trains phase shifted with respect to each other, and having a frequency depending upon the difference between the frequencies of said reference frequency oscillations and the frequency of said radio frequency signals, said circuit means having demodulator means for said phase shifted pulse trains to produce the envelopes of said trains of pulses, voltage limiting means for said pulse trains, rectifying means to produce half waves from one of said pulse trains, means to convert said half waves into square waves, charge storage means for said square waves, means to produce peaked voltage waves from the other of said pulse trains, discharge means connected to apply said peaked voltage to said charge storage means to discharge it, so that the voltage of said charge storage means is of large or small average value depending upon whether the frequency of said reference oscillations is greater or less than that of said radio frequency signals, and means for adjusting the frequency of said source of radio frequency signals to reduce the difference between it and the frequency of said reference source.

5. Means for controlling the distance between two mechanically independent elements comprising two mechanically independent elements, connections for utilizing the electrical capacity between said elements as a part of a resonant circuit, connections for utilizing said resonant circuit to control the frequency of an oscillator, and mechanism responsive to the departure of said frequency from a preassigned value for changing the effective distance between said elements in such a direction as to reduce said departure.

6. In an information reproduction system, storage means for signals representing information to be reproduced, means to pick up said signals and convert them into information signals, and circuit characteristic controlling means for maintaining said information signals representative of said stored signals within a selected degree of accuracy, said circuit characteristic controlling means comprising a resonant circuit portion, elements of which are associated with the storage means and with the pickup means, the relation between said elements being variable with variations in the distance between said storage means and said pickup means to change the resonant frequency of said circuit portion, and means for changing the effective distance between said pickup means and storage means in response to changes in said resonant frequency, whereby to minimize the effects of fortuitous changes in said distance.

7. In a picture reproduction system, a light transmitting storage means for signals representing an image to be reproduced, optical means to pick up said signals and convert them into video signals, and circuit characteristic controlling means for maintaining said video signals representative of said stored signals within a selected degree of accuracy, said circuit characteristic controlling means comprising a resonant circuit portion, elements of which are associated with the storage means and with the pick up means, the relation between said elements being variable with variations in the distance between said storage means and said pick up means to change the resonant frequency of said circuit portion, and means for changing the effective optical distance between said pick up means and storage means in response to changes in said resonant frequency and in such manner as to minimize said changes in resonant frequency, whereby to minimize the effects of fortuitous changes in said distance.

8. The picture reproduction system of claim 7, wherein said optical means includes means to project light through said storage means and photo cell means to receive light projected through said storage means and transform it into video signals.

9. The system of claim 8 wherein the means to project light provides substantially unvarying illumination of said storage means, and the photo cell means is a cathode ray flying spot scanner means.

10. The combination set forth in claim 7, wherein said variable relation changes a variable condenser element of said resonant circuit.

11. The combination set forth in claim 10, said light transmitting source forming part of said variable condenser element.

12. In a device for utilizing the comparison between two frequencies to adjust an optical system, a reference source of radio frequency oscillations, circuit means having a radio frequency phase shifting portion connected to said source, a second source of radio frequency oscillations comprising a light transmitting source of radio frequency signals also representing an image to be reproduced, flying spot means to project light through said signal source, a lens system and photo electric means to focus said light transmitting source and transform it into video signals, said circuit means providing two oscillations of the same frequency differing in phase by approximately ninety degrees with respect to each other, means to beat said oscillations from said second source against each of the two phase differing oscillations, said circuit means comprising a portion connected to produce pulses resulting from said beats, and frequency adjusting means for one of said sources comprising a tuned circuit portion having a variable element, mounting means carrying said variable element and a lens of said lens system constructed to adjust the frequency of said one source of oscillations toward the frequency of the other source, said adjusting means being connected to said circuit means and actuated by said pulses.

13. The combination set forth in claim 12, said light transmitting source being conducting, and forming part of said variable element of said tuned circuit, said variable element being a condenser.

14. The combination set forth in claim 12, said second source of radio frequency oscillations comprising light transmitting and modulating means.

15. In an information reproduction system, the combination set forth in claim 5, a light source for said system, said two mechanically independent elements comprising a lens and light modulating means.

16. The combination set forth in claim 15, said light modulating means comprising signal storage means having permanent light modulating characteristics.

17. The combination set forth in claim 16, said signal storage means comprising an acidulated base having the signals stored therein, light responsive means positioned to receive signals reproduced by the combined action of said light source, said lens and said acidulated base, amplifying means for said light responsive means and information reproduction means connected to said amplifying means for reproducing said stored signals.

18. The combination set forth in claim 17, said information reproduction means comprising a television receiver having a picture screen on which said stored signals are presented, said acidulated base being a record having the signals stored as individual frames arranged for sequential scanning.

19. The combination set forth in claim 18, said acidulated base being a disc and comprising a cobalt salt.

20. The combination set forth in claim 5, said mechanism comprising means for producing a magnetic field of constant value, a movable coil positioned in said field and positioning means connected to said coil and movable in response to movement of said coil for changing the effective distance between said elements.

21. The combination set forth in claim 5, said mechanism comprising a reversble motor, a source of power for said motor and means for reversing the action of said motor for changing the effective distance between said elements.

References Cited in the file of this patent

UNITED STATES PATENTS

| | | |
|---|---|---|
| 1,019,931 | Victor | Mar. 12, 1912 |
| 1,409,004 | Jenkins | Mar. 7, 1922 |
| 1,931,873 | Marrison | Oct. 24, 1933 |
| 1,934,400 | Bollman | Nov. 7, 1933 |
| 2,104,801 | Hansell | Jan. 11, 1938 |
| 2,134,757 | Goldsmith | Nov. 1, 1938 |
| 2,403,628 | Beers | July 9, 1946 |
| 2,415,702 | Morrison | Feb. 11, 1947 |
| 2,423,617 | Rath | July 8, 1947 |
| 2,445,663 | Doelz | July 20, 1948 |
| 2,521,700 | Dodington | Sept. 12, 1950 |
| 2,522,078 | Walker | Sept. 12, 1950 |
| 2,525,891 | Garman | Oct. 17, 1950 |
| 2,531,974 | Ellett | Nov. 28, 1950 |
| 2,540,333 | Hugenholtz | Feb. 6, 1951 |
| 2,541,454 | White et al. | Feb. 13, 1951 |
| 2,560,365 | Norton | July 10, 1951 |
| 2,625,602 | Somers | Jan. 13, 1953 |
| 2,779,819 | Graham | Jan. 29, 1957 |
| 2,786,888 | Hadfield | Mar. 26, 1957 |